United States Patent [19]

Chen

[11] 4,439,698
[45] Mar. 27, 1984

[54] LINEAR SLIDING MOTOR DEVICE

[76] Inventor: Der-Jong Chen, 1 Floor, 77, Section 2, Nei Hu Rd., Taipei, Taiwan

[21] Appl. No.: 325,487

[22] Filed: Nov. 27, 1981

[51] Int. Cl.³ .............................................. H02K 41/00
[52] U.S. Cl. ....................................... 310/12; 310/14
[58] Field of Search .................................... 310/12–14

[56] References Cited

U.S. PATENT DOCUMENTS

| Re. 28,358 | 3/1975 | Sommeria | 310/14 |
|---|---|---|---|
| 384,775 | 6/1888 | Mengis | 310/14 |
| 419,166 | 1/1890 | Williams | 310/14 |
| 668,978 | 2/1901 | Carlson | 310/146 |
| 1,020,942 | 3/1912 | Bachelet | 310/14 |
| 1,241,333 | 9/1917 | Bowman | 310/14 X |
| 3,493,160 | 2/1970 | Sumrall et al. | 310/12 |
| 4,214,178 | 7/1980 | Tippner | 310/14 |

Primary Examiner—Donovan F. Duggan
Attorney, Agent, or Firm—Cushman, Darby & Cushman

[57] ABSTRACT

A linear sliding motor device which includes a solenoid assembly, a sliding rail assembly, and a switching assembly (or a microswitch assembly). Whenever the solenoid is energized with A.C. or D.C. electrical current, the magnetic field generated will magnetize a ferromagnetic piece located near the solenoid, and will attract said ferro-magnetic piece into the core of the solenoid. Three or more solenoids are connected in series, of which the hollow cores are filled with a rail arranged with ferro-magnetic pieces; then, the power supply of said solenoids is timely and alternately turned on or off by means of a switching means (or a micro-switch assembly). Now, every solenoid will attract the ferromagnetic piece in the rail one by one in a relay-race manner; if the rail is fixed, the solenoid will move linearly, and vice versa. The linear movement may be arranged towards different direction through an appropriate switching method.

8 Claims, 14 Drawing Figures

LINEAR SLIDING MOTOR DEVICE

BACKGROUND OF THE INVENTION

The general linear motor is referred to as a linearly moving motor, of which the theory is the same as that of the induction motor. When an induction motor is energized with A.C. electrical current, its stator winding will generate a rotating field to drive the rotor rotating by magnetic induction.

Suppose that an induction motor is cut along its axial direction, and its stator windings are spreaded into a plane arrangement; as soon as the stator windings are energized, a linearly moving field will be generated, and the rotor will also be driven, by magnetic induction, to move linearly. This is the theory for the general linear motor.

Since the general linear motor has a larger body size, complicated structure, and a small starting power, it is not used popularly.

In using a general motor for a linearly moving belt, cam, or crank transmission through an axle, it is usually adapted to convey an article moving linearly; however, these are not the ideal means to do the job as result of its drawbacks of large body size, complicated structure, or greater friction co-efficient, and short conveying distance, etc.

Therefore, the present invention is hereby developed with a view to improve the aforesaid drawbacks, and to provide a device having simple structure, using either A.C. or D.C. electrical current, having greater starting power so as to be used for driving an electric-window curtain, window, or door, or any equipment in the industrial field involving linear movement.

SUMMARY OF THE INVENTION

The object of this invention is to provide A Linear Sliding Motor Device, in particular, a device having a simple structure, using either A.C. or D.C., and able to convey a load moving back and forth linearly.

Another object of the present invention is to provide the operation pre-requisites during manufacturing so as to have this device sliding smoothly and swiftly.

This invention comprises a solenoid assembly having "n" solenoids, where "n" should be an integral number equal to or greater than "3", and also comprises a sliding rail assembly and a switching assembly; the solenoid assembly being sleeved over the sliding rail assembly, and whenever a power is applied to the solenoid through the switching assembly, the solenoids will attract the ferro-magnetic piece in the sliding rail so as to cause linear movement in a relay-race manner.

The operation pre-requisites of this invention are briefly described as follows:

In order to have every solenoid in the solenoid assembly able to contact with a corresponding point of the next ferro-magnetic piece after completing a unit of distance along the rail, the relation between the solenoid assembly and the ferro-magnetic piece should be defined:

$$n(L+l)=(n-1)(D+d);$$

in other words, the sum of the length of "n" solenoids is equal to the distance between the two adjoining corresponding points of ferro-magnetic pieces being multiplied with $(n-1)$.

In order to ensure every brush of the solenoid assembly is contacted with the corresponding point of the next switching means after completing a unit of distance along the rail, the relation between the switching assembly and the ferro-magnetic piece should be defined by: $g+g'+2t=D+d;$ in other words, the distance between the two adjoining corresponding points of said switching means at one side should be equal to the distance between the two adjoining corresponding points of the ferro-magnetic pieces.

Further, when the sum of the brush length(b) and the length(t) of a single switching means is equal to $(1/n)(D+d)$, the brush and the switching means should be considered at a critical point.

In the case of $(1/n)(D+d)>b+t$, the relay-race attracting effect will be interrupted between the solenoids and the ferro-magnetic pieces as a result of the brush being unable to timely contact with the switching means. In the event of $t+b \geq \frac{1}{2}(D+d)$, it will result in the rear end of the solenoid being pulled back by the same ferro-magnetic piece upon the solenoid which inwardly attracts the ferro-magnetic piece inwards. Therefore the relation between them should be defined by:

$$(1/n)(D+d) \leq b+t < \frac{1}{2}(D+d)$$

DETAILED DESCRIPTION

This invention provides a linear sliding motor device, in particular, a device to use magnetic force for pulling an article back and forth in linear direction, which mainly comprises a total of three components, i.e., the solenoid assembly (1-11), sliding rail assembly (1-12), and the switching assembly (1-13) (or a micro-switch assembly).

The theory of this invention is that when a solenoid is energized, it will become a magnetic dipole, which generates a magnetic field. If a ferro-magnetic piece is placed near one end of the solenoid, the piece will be attracted into the solenoid.

Now, when three or more than three the solenoids are used forming a series and being sleeved over a rail arranged with a series of ferro-magnetic pieces of same size; then, the power applied to the solenoids will be turned to "ON" or "OFF" one after another thru the switching assembly (or micro-switch assembly) at a given time sequence so as to have the solenoids attracting the ferro-magnetic pieces respectively in regular sequence. If the sliding rail assembly is fixed, the solenoid will move forwards; when one solenoid moving, another solenoid will follow to move over the ferro-magnetic piece. Consequently, the solenoids will slide linearly in a relay-race manner.

The structure, the functions, and the objects of this invention are further described, in detail, together with the drawings attached as follows:

(1) The Solenoid Assembly

Figure 3:
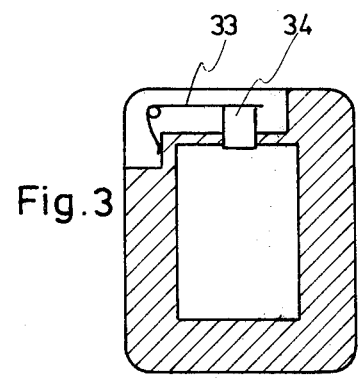
FIG. 3 shows part of an isometric and sectional view of a solenoid assembly embodiment of this invention.
Figure 4:
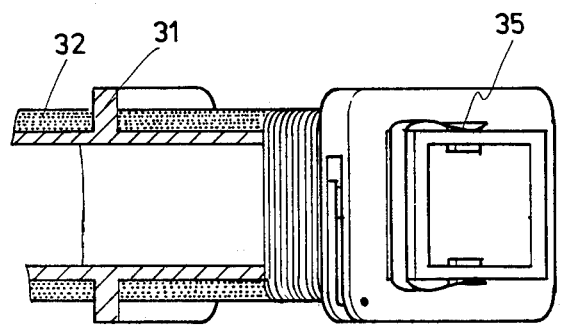
FIG. 4 shows a cross-sectional view of said solenoid assembly embodiment in this invention.

As shown in FIGS. 3 and 4, said solenoid assembly comprises three separate heatproof rigid plastic reels (31), each of them is wound with an enamelled wire to form one solenoid(32) (The turns of the winding and the number of said enamelled wire are determined by the voltage to be applied and the load); at one end of each solenoid, a carbon brush holder(33) is provided for holding the brush(34). The loop circuit of the device is going thru the sliding rail, the conductive clamp(35) at the front end of the solenoid, each solenoid, the brush, the switching assembly, and finally connected to the power supply.

(2) The Sliding Rail Assembly

Figure 5:
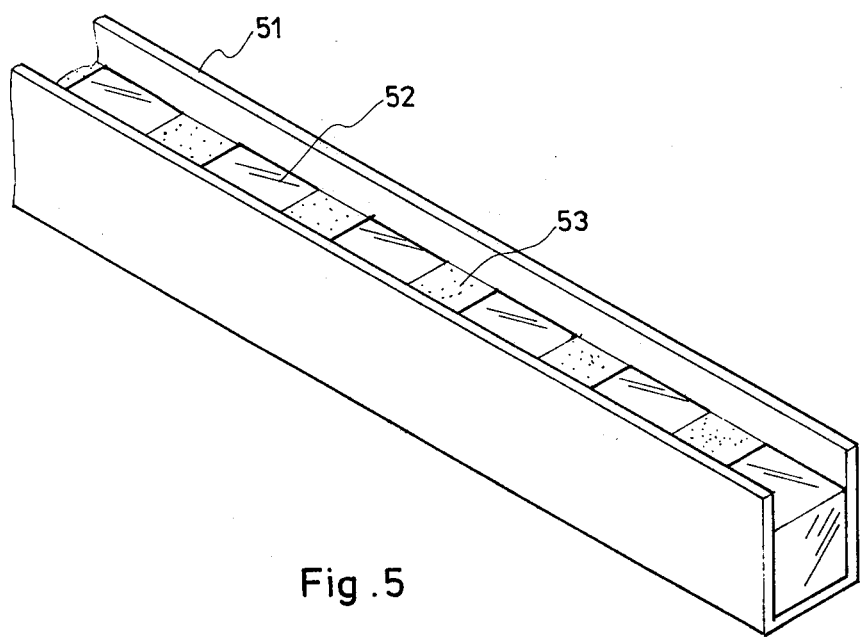
FIG. 5 shows an outer and isometric view of a sliding rail embodiment in this invention.

As shown in FIG. 5, it is made of aluminum being pressed into a U-shaped channel(51), in which a series of soft iron pieces(52) of same size are fixedly filled at equal distance. In the space between each of the soft iron piece(52), a filling material(53) is injected so as to have the sliding rail becoming a solid body. One end of the U-shaped channel(51) is connected to the power supply so as to energize the solenoid through the conductive clamp(35) whenever it slides along the sliding rail assembly.

(3) The Switching Assembly

Figure 6:
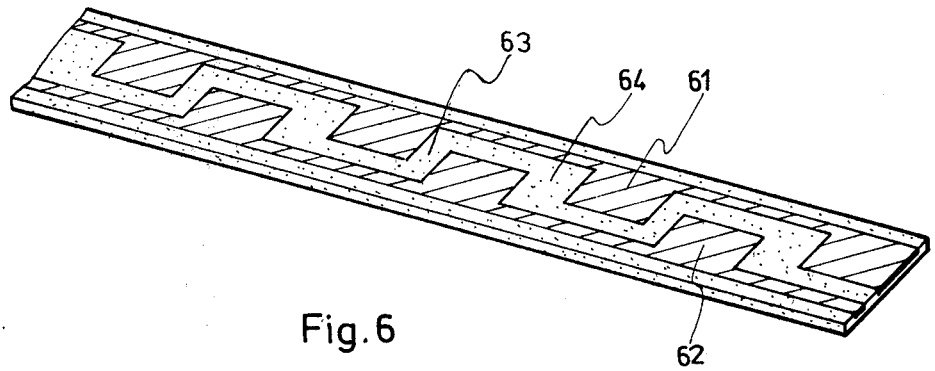
FIG. 6 shows an outer and isometric view of a switching assembly embodiment in this invention.

As shown in FIG. 6, the switching assembly comprises a right switching means(61) and a left switching means(62) made of a printed-circuit board with an insulated copper plate about 0.3mm thick, and a space(63) defined between the right and left switching means(61, 62). Right and left switching means(61, 62) form a pair, and between each pair of the switching assembly, there is a space(64). The switching assembly is installed on the sliding rail with one terminal being connected to switch for controlling the power supply to the right or left switching means(61 or 62). Upon this assembly being assembled with the sliding rail assembly, they will be placed into the hollow space in the solenoid so as to have the brush(34) inside the solenoid in contact with the switching means. When the switch supplies power to the right and left switching means, the current will pass thru the conductive clamp(35), and the brush, to form complete loop circuit.

Figure 1:
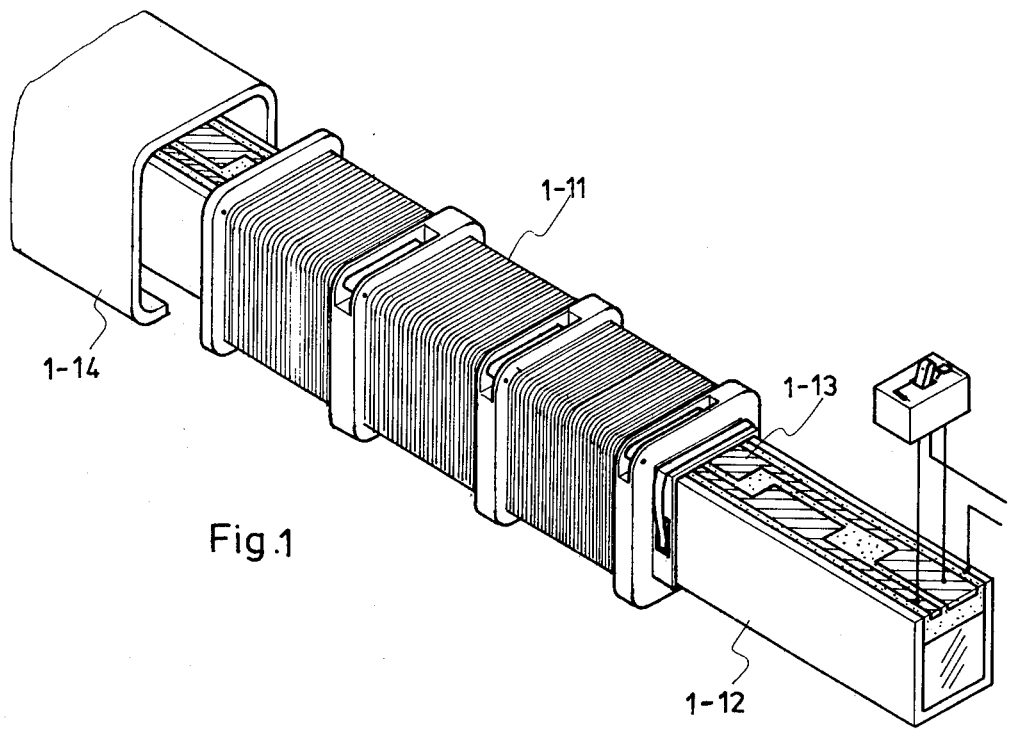
FIG. 1 shows an outer and isometric view of an embodiment of this invention.

As shown in FIG. 1, in order to protect the inner components and to conceal the spark during the solenoid sliding along the sliding rail, the aforesaid three assemblies are covered with an outer cover(1-14) made of metal or plastic material.

Figure 2:
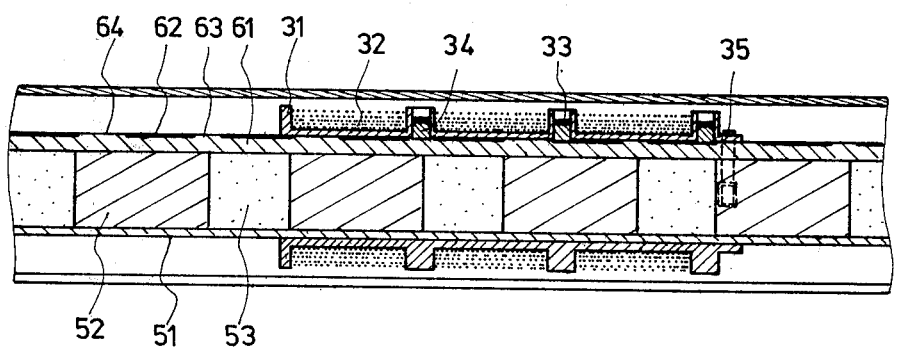
FIG. 2 shows a longitudinal sectional view of an embodiment of this invention.
Figure 7:
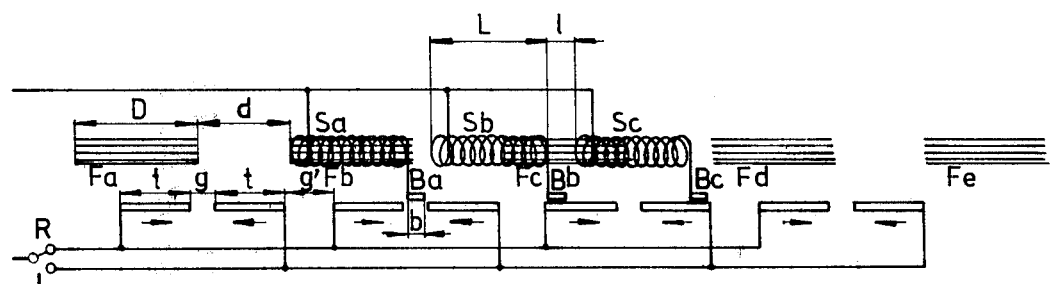
FIG. 7 shows a circuit diagram of an embodiment in this invention, using switching assembly.
Figure 8:
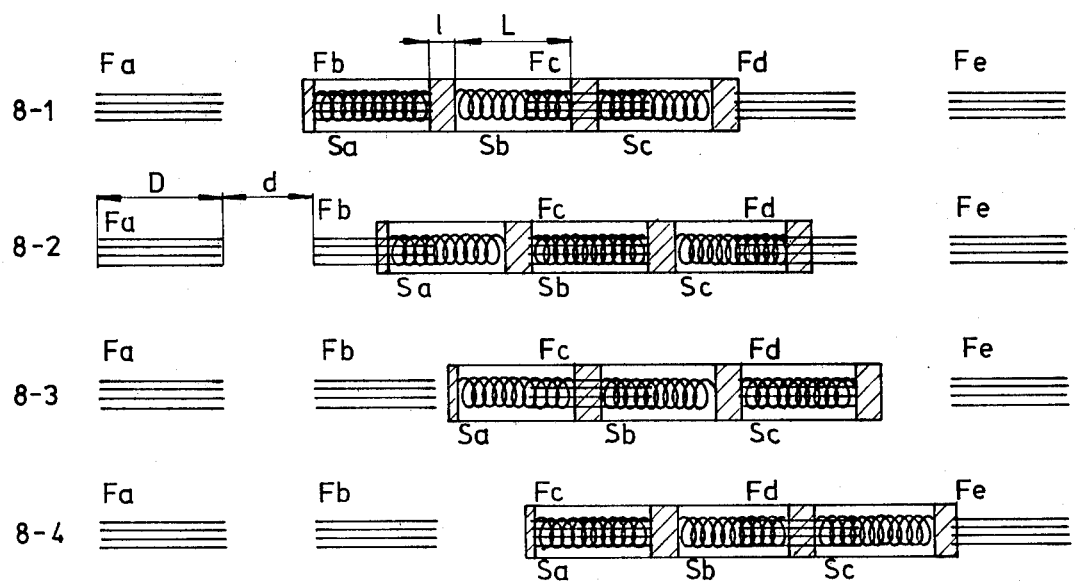
FIG. 8 shows an operation steps of an embodiment in this invention.

In order to turn the current on or off timely in this invention and to have the front end of the solenoid attracting the ferro-magnetic piece upon being energized, and to generate attracting force alternately for smooth sliding action there must be an operational relation among the solenoid assembly, said sliding rail assembly, and the switching assembly; the operational relation and the operational steps thereof are further described as follows:

As shown in FIGS. 7 and 8, three solenoids(32) are arranged from left to right as indicated with Sa, Sb, and Sc; each having a length equal to "L", and the distance between two ajacent solenoids is "l". The soft iron pieces(52) in the sliding rail, which is installed in the hollow of the solenoid, are arranged from left to right as indicated with Fa, Fb, Fc, Fd, and Fe. If the length of said soft iron piece is "D", and the distance between two soft iron pieces is "d", as shown in FIG. 8-1, and when only solenoid(Sb) is energized, the attracting force of solenoid(Sb) to the soft iron piece(Fc) will be stronger than that to soft iron piece(Fb); then, the whole solenoid assembly will move to right side. As shown in FIG. 8-2, when solenoid (Sc) is energized, and solenoid(Sb) is de-energized, the attracting force of solenoid(Sc) to the soft iron piece(Fd) will be stronger than that to the soft iron piece(Fc); consequently, the whole solenoid assembly will move rightwards.

As shown in FIG. 8-3, when solenoid(Sa) is energized, and solenoid(Sc) is de-energized, the attracting force of solenoid(Sa) to the soft iron piece(Fc) will be stronger than that to the soft iron piece(Fb); consequently, the whole solenoid assembly will move to right side further.

As shown in FIG. 8-4, the three solenoids have been energized once in a relay-race manner; it means that the whole solenoid assembly has, along the sliding rail, moved a unit of distance along the rail (D+d) rightwards. If said rightwards movement is cyclically maintained, the solenoid assembly will move rightwards along the sliding rail continuously. By the same theory, the solenoid assembly can also be moved leftwards.

When the solenoid assembly completely moves a unit of distance (D+d) along the sliding rail, each of the solenoids, being energized, has moved $\frac{1}{3}(D+d)$ along the sliding rail; in other words, the corresponding position of starting to move and the distance of $\frac{1}{3}(D+d)$ to be completed of every said solenoid along the soft iron piece in said sliding rail should be the same corresponding position. The relation between the sliding rail assembly and the solenoid assembly is: $\frac{1}{3}(D+d)+(L+l)=(D+d)$; the aforesaid equation may be converted into: $3(L+l)=2(D+d)$, in which, $L>1$, and $2d>D>d/2>0$; if $L<1$, there will be more play, and a part of the soft iron piece will be unable to enter into said solenoid; consequently, the attracting force will be reduced. In order not to let the rear soft iron piece enter into the rear region of said solenoid energized having stronger attracting force, let $D<2d$, and $d/2>0$. (As shown in FIG. 8-1, if the length of said soft iron piece, $D>2d$, and when (Sb) contacting with the front end of (Fc), it will be caused that the (Fb) will contact with the rear end of (Sb), and a great part of attracting force at the front end will be offset the rear end attracting force, and it will be unable to move forwards.)

To have $D>d/2$ is to avoid "D" being too short to have the solenoid generating attracting force to cause the front ends of the next solenoid and the soft iron piece contacted and to generate sufficient attracting force. Said solenoids in the present invention may be designed to use more than three arranged in series; for example, use "n" solenoids; then, $n(L+l)=(n-1)(D+d)$, in which $L>1$, and $(n-1)d>D>d/(n-1)>0$. The Theory in using "n" solenoid is the same as that of using three solenoids; in a practicable point of view, it is better to adopt a small "n", and to have $D=L$.

As shown in FIG. 7, each said solenoid is provided with a brush(34), and is arranged from left to right side in an order as indicated with Ba, Bb, Bc, which are contacted with the switching means. When the switch is put at right side, the right switching means(61) will be connected to the power supply, and when said switch is put at left side, the left switching means(62) will be connected to the power supply.

Assuming that the length of said both the right and left switching means is "t", the space between them is "g", and the space between each pair of said switching means is "g'", and when said right switching means is connected to the power supply, the brush(Bb) will contact with the right switching means, as shown in the FIG. 8, and has no contact with the rest two brushes (Ba, and Bc).

As shown in FIG. 8-2, the Bc is contacting with the right switching means; in FIG. 8-3, it shows that Ba is contacting with the right switching means. As shown in FIG. 8-4, the Bb is again contacting with said right switching means. The brushes (Ba, Bb, Bc) can only contact with the right switching means on condition that the unit of moving distance along the rail (D+d) is equal to the distance of corresponding position between two said right (or left) switching means (i.e. $g+g'+2t$), and therefore $D+d=g+g'+2t$.

If the length said brushes is "b", $b<g$, and $b<g'$; otherwise, said brush would across contact both the right and left switching means, and result a short circuit between said both switching means. Further, the sum of the lenght(t) of said right switching means and the length(b) of said brush should be greater than or equal to $\frac{1}{3}(b+d)$, and be less than $\frac{1}{2}(D+d)$, i.e., $\frac{1}{3}(D+d) \leq t+b < \frac{1}{2}(D+d)$; when $\frac{1}{2}(D+d)=t+b$, it will reach to a critical point of one brush disconnecting with the switching means, while another brush contacting with another switching means. To set $t+b > \frac{1}{2}(D+d)$ is for the purpose of preventing when one brush disconnecting one switching means, another brush being unable to contact with another switching. To set $t+b < \frac{1}{2}(D+d)$ is for the purpose of avoiding when the soft iron piece being attracted into the rear end of said solenoid, the current of said solenoid will still not be turned off; as a result, the attracting force of the rear end of said solenoid will pull the soft iron piece back again, and will cause it unable to move forwards.

If "n" solenoids are arranged in series, said "n" is an integral number and is equal to or greater than "3"; then, the relation among said solenoids, the switching assembly, and the sliding rail assembly should be expressed with:

$(1/n)(D+d) \leq t+b < \frac{1}{2}(D+d)$.

If the mounting location of said brushes are changed, the corresponding positions between the switching means and the sliding rail should also be changed.

The corresponding position between the middle of said brush and the middle of said solenoid should be equal to the relative position between the middle of each pair of said switching means and the middle of the corresponding soft iron piece. In other words, if said brush is fitted at the middle of said solenoid, the middle of each pair of said switching means will coincide with the middle of said soft iron piece. Therefore, the position of said brush may, if necessary, be changed under the aforesaid conditions.

Figure 9:
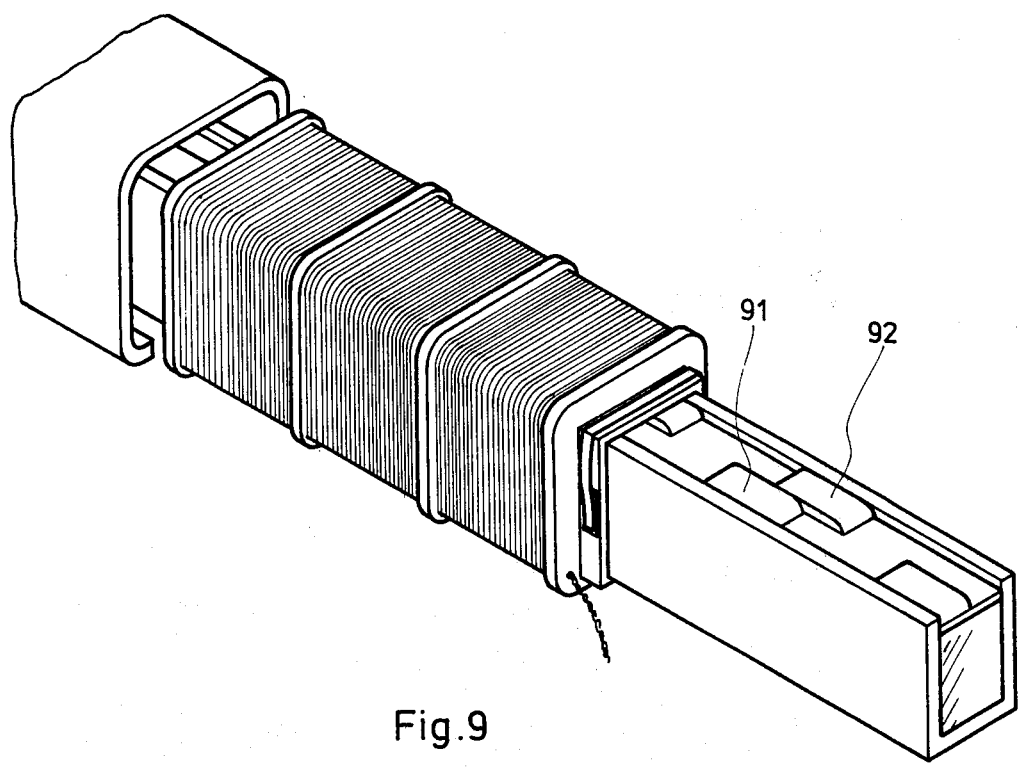
FIG. 9 shows another outer and isometric view of an embodiment in this invention.
Figure 10:
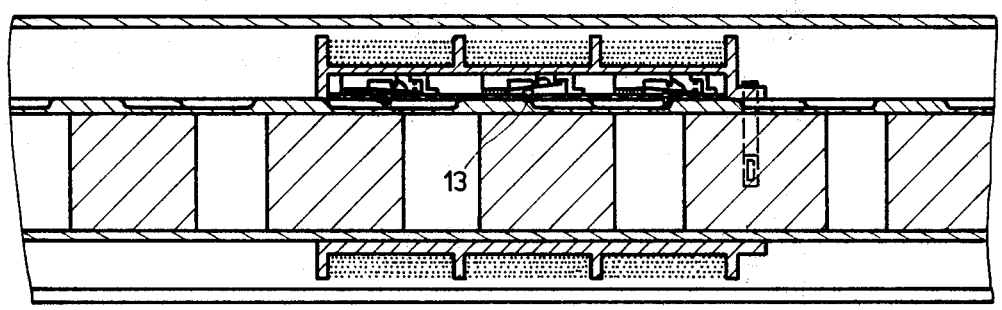
FIG. 10 shows another longitudinal sectional view of an embodiment in this invention.
Figure 11:
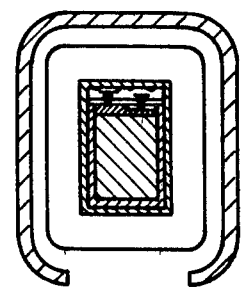
FIG. 11 shows a cross-sectional view of another solenoid assembly embodiment in this invention.
Figure 13:
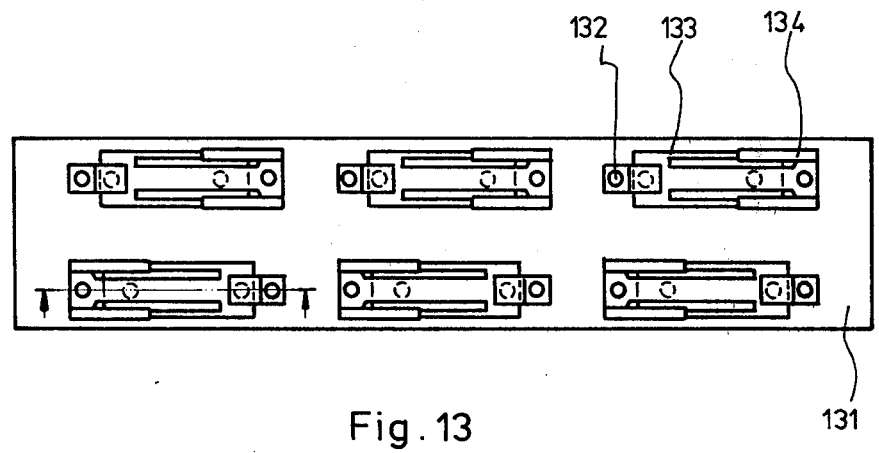
FIG. 13 shows a plan view of a micro-switch embodiment in this invention.
Figure 14:
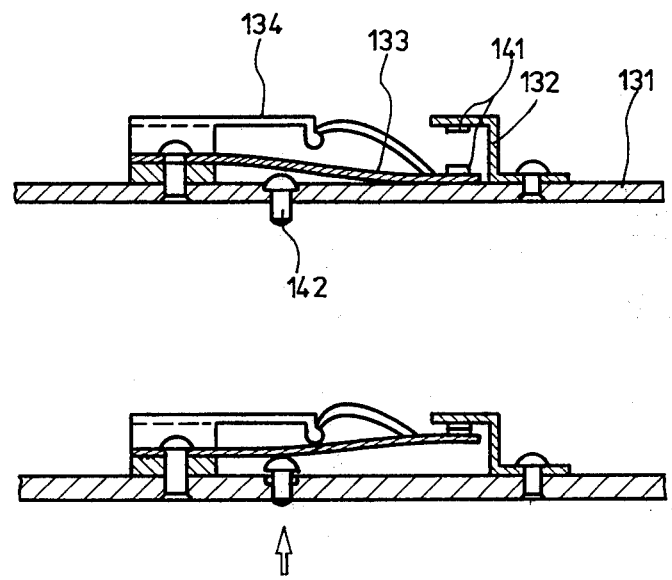
FIG. 14 shows part of a cross-sectionl view of said micro-switch embodiment in this invention.

The embodiment described above comprises three major components, i.e., the solenoid assembly, the sliding rail assembly, and the switching assembly. In the present invention, a micro-switch assembly may be used for replacing said printed circuit board, the brush holder(33), and the brush in the switching assembly. Further description about that micro-switch assembly is given, together with the FIG. attached, as follows:

As shown in FIGS. 9 and 10, on said sliding rail assembly, many right and left switching protruding blocks(91) and (92) are arranged on a pair-by-pair basis. The microswitch(13) is installed inside the solenoid, and contacted with said switching protruding block. The inner structure of said micro-switch is shown in FIGS. 13 and 14; on the base plate(131), there are two rows of micro switches in parallel, and each of said rows comprises three micro switches, each of which comprises a conductive plate(132), a spring plate(133), a supporting base(134), a silver contact point(141), and a contact stud(142). When said micro switch sliding over the switching protruding blocks, the contact stud will, upon hitting the switching protruding blocks, lift up the spring plate(133); then, the silver contact point(141) will contact with the upper contact point to turn on the current.

Figure 12:
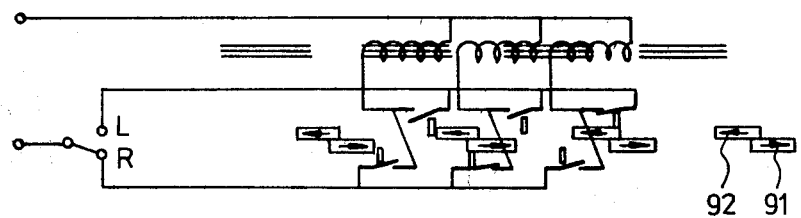
FIG. 12 shows another circuit diagram of an embodiment in this invention, using micro-switch assembly.

FIG. 12 shows an embodiment using said micro switch assembly. The operation theory, sequence, and conditions of said embodinment are the same as that of the aforesaid embodiment except by means of the micro switch to control the "ON/ OFF" of power of said solenoid.

Summing up the aforesaid descriptions, this invention will provide a device of simple structure, and to move linearly back and forth along the sliding rail assembly. According to the use, this invention may be classified into two types, by means of its assembling method, as follows:

(1) A fixed rail: The solenoid is used to pull a load moving back and forth. If the load is too heavy to pull, a framed pulley may be used to carry the load, such as, an automatic door, or window. If the load is not heavy, the sliding rail may be used to carry the load, such as, a window curtain.

(2) A fixed solenoid: In this case, the sliding rail is used for carrying the load.

Further, this invention may also be used for other industrial equipment which involve linear movement.

I claim:

1. A device for effecting linear movement comprising:

a plurality of solenoid means each having an energized state for creating a magnetic field when electrical current is applied to said solenoid to attract a ferro-magnetic member, and including means defining an interior space, said plurality of solenoid means being linearly assembled one to another, said space of each communicating with the spaces of adjacent ones of said solenoid means to form an elongated cavity;

an elevated rail slideably coupled in said cavity and including linearly spaced apart ferro-magnetic members; and first switching means fixed to and carried with said rail for effecting selective sequential energization of said solenoid means to sequentially create a magnetic field to attract a predetermined one of said ferro-magnetic members and thus effect relative linear sliding movement of said solenoid means with respect to said rail, said first switching means including right and left switching means each defining a continuous tooth-shaped electrically conductive strip disposed along the axial length of said rail, the teeth of said right switching means being alternatively interposed between the teeth of said left switching means, said electrically conductive strips of said right and left switching means defining therebetween an electrically insulated area, opposite adjacent ones of said teeth of said right and left switching means forming a pair of electrically conductive members each associated with a predetermined one of said ferro-magnetic members;

second switching means operatively connected to said right and left switching means for selectively electrically energizing one of said right or left switching means and to selectively electrically degenergize the other of said right or left switching means to establish the direction of said relative linear sliding movement of said solenoid means with respect to said rail; and brush means associated with each of said solenoid means, each of said brush means sequentially contacting one of said pair of electrically conductive members as said solenoid means moves linearly relative to said rail to sequentially energize said solenoid means to effect linear movement of said solenoid means relative to said rail, wherein said solenoid means linearly moves relative to said rail in a first direction when said right switching means is electrically energized by said second switching means, said brush means of said solenoid means thereby sequentially coming into and out of contact with the teeth of said right switching means, and wherein said solenoid means linearly moves in a second direction, opposite to said first direction, when said left switching means is electrically energized by said second switching means, said brush means of said solenoid means thereby sequentially coming into and out of contact with the teeth of said left switching means.

2. A device as in claim 1 wherein said solenoid means comprises n separate solenoids arranged in series, wherein n is an integer greater than or equal to 3; and wherein said solenoids include a brush holder and a brush; the relative position between the middle of each of said solenoid and the middle of a corresponding brush being equal.

3. A device as claimed in claim 2 wherein the relationship between said solenoid assembly and said rail assembly is defined by the equation $n(L+l)=(n-1)(D+d)$, wherein L is the axial length of each of said solenoids, D is the axial length of said ferro-magnetic members, and d is the dimension between adjacent ferro-magnetic members and wherein $L>l$, $(n-1)d>D>d/n-1>0$.

4. A device as in claim 3 wherein said switching means and said rail are related by the expression: $g+g'+2t=D+d$, wherein g is the axial linear space between each one of said pair of conductive members, g' is the axial linear space between adjacent ones of said pairs of conductive members, t is the axial linear dimension of each one of said pairs of conductive members, and D is the axial linear length of said ferro-magnetic members.

5. A device as claimed in claim 4 wherein the relationship between said solenoid means, said rail and said switch means is expressed according to:

$$(1/n)(D+d) \leq t+b < \tfrac{1}{2}(D+d)$$

wherein b is the axial length of said brush means.

6. A device as claimed in claim 2 wherein the relative position between the middle of said brush and the middle of its corresponding said solenoid is equivalent to the relative position between the middle of said each pair of conducting members and the middle of said ferro-magnetic member corresponding to said pair of conductive members.

7. A device as claimed in claim 1 wherein each pair of said conductive members are on the opposite side of its corresponding ferro-magnetic member, and the relative position between the middle of said each pair of conductive members and the middle of their corresponding said ferro-magnetic member is equal.

8. A device as in claim 7, wherein the relative position between the middle of each of said brush means and the middle of a corresponding one of said solenoids is equivalent to the relative position between the middle of said each pair of conductive members and the middle of a corresponding one of said ferro-magnetic members.

* * * * *